United States Patent
Tang (10) Patent No.: US 9,748,839 B2
(45) Date of Patent: Aug. 29, 2017

(54) DIGITAL VOLTAGE REGULATOR CONTROLLER WITH MULTIPLE CONFIGURATIONS

(71) Applicant: Infineon Technologies Austria AG, Villach (AT)

(72) Inventor: Benjamim Tang, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 612 days.

(21) Appl. No.: 14/230,943

(22) Filed: Mar. 31, 2014

(65) Prior Publication Data

US 2015/0280563 A1 Oct. 1, 2015

(51) Int. Cl.
*G06F 17/50* (2006.01)
*H02M 3/158* (2006.01)
*H02M 3/157* (2006.01)
*H02M 1/00* (2006.01)

(52) U.S. Cl.
CPC ........... *H02M 3/158* (2013.01); *H02M 3/157* (2013.01); *H02M 3/1584* (2013.01); *H02M 2001/008* (2013.01)

(58) Field of Classification Search
CPC ...................................................... G06F 17/50
USPC ........................................................ 716/117
See application file for complete search history.

(56) References Cited

U.S. PATENT DOCUMENTS

| | | | | |
|---|---|---|---|---|
| 4,785,226 A | * | 11/1988 | Fujisawa | ................... H02J 7/35 |
| | | | | 136/293 |
| 2013/0028395 A1 | * | 1/2013 | Huang | ................ H04M 19/001 |
| | | | | 379/32.04 |

FOREIGN PATENT DOCUMENTS

| | | |
|---|---|---|
| CN | 1685459 A | 10/2005 |
| CN | 1698023 A | 11/2005 |
| CN | 101512456 A | 8/2009 |
| CN | 101931321 A | 12/2010 |
| CN | 103683976 A | 3/2014 |

* cited by examiner

*Primary Examiner* — Thuan Do
(74) *Attorney, Agent, or Firm* — Murphy, Bilak & Homiller, PLLC (57) ABSTRACT

A digital voltage regulator controller includes control logic, an interface and configuration logic. The control logic is operable to control power stages of a voltage regulator so that groups of one or more of the power stages individually regulate one or more output voltages of the voltage regulator. An external electrical parameter that indicates a location of the controller on a board or a version of the board is measured via the interface. The configuration logic is operable to determine a set of configuration parameters for the voltage regulator based on the location of the controller on the board or the version of the board as indicated by the external electrical parameter, and configure the control logic in accordance with the set of configuration parameters so that each output voltage is regulated based on the location of the controller on the board or the version of the board.

25 Claims, 5 Drawing Sheets

DIGITAL VOLTAGE REGULATOR CONTROLLER WITH MULTIPLE CONFIGURATIONS

TECHNICAL FIELD

The present application relates to digital controllers for voltage regulator, in particular digital voltage regulator controllers with multiple configurations.

BACKGROUND

Voltage regulators are widely used in modern electronic systems for a variety of applications such as computing (server and mobile) and POLs (Point-of-Load Systems) for telecommunications because of their high efficiency and small amount of area/volume consumed by such converters. Widely accepted voltage regulator topologies include buck, boost, buck-boost, forward, flyback, half-bridge, full-bridge, and SEPIC topologies. Multiphase buck converters are particularly well suited for providing high current at low voltages needed by high-performance integrated circuits such as microprocessors, graphics processors, and network processors. Buck converters are implemented with active components such as a pulse width modulation (PWM) controller IC (integrated circuit), driver circuitry, one or more phases including power MOSFETs (metal-oxide-semiconductor field-effect transistors), and passive components such as inductors, transformers or coupled inductors, capacitors, and resistors. Multiple phases (power stages) can be connected in parallel to the load through respective inductors to meet high output current requirements.

Power supply requirements for electronic systems are complex, with many different power supply rails (output voltages) generated for different requirements such as voltage, current, start-up, etc. in typical multi-component boards. POL regulators are an efficient way of distributing power, allowing the voltage supply to be generated in close proximity to the load. Digital voltage regulators are becoming widely accepted for POLs, offering flexibility to implement a diverse set of output requirements with good performance and a rich set of features. Digital voltage regulators typically rely on a stored configuration or program, which implements the design features required of each rail (output voltage). Management of digital voltage regulator controllers is a significant issue because there is little or no physical identification indicating which component is associated with which rail.

In one conventional approach, configuration information associated with the location of a digital voltage regulator controller on a board is provided by pin programming the controller with the configuration information through external resistors. However this approach requires a large set of external components to support a wide array of configuration options, increasing board size and cost. Another conventional technique involves implementing part management of digital voltage regulator controllers with different stored configurations. This approach requires a costly and complex part management process, and increases the risk for misconfigured components. In another conventional technique, digital voltage regulator controller configuration information is downloaded from a bus master during initialization. This approach requires time to perform the download. In each case, it is a challenge to rework or replace bad controllers on a board.

SUMMARY

According to an embodiment of a digital voltage regulator controller, the controller comprises control logic operable to control a plurality of power stages of a voltage regulator so that groups of one or more of the power stages individually regulate one or more output voltages of the voltage regulator and an interface for measuring an external electrical parameter that indicates a location of the controller on a board or a version of the board. The controller further comprises configuration logic operable to determine a set of configuration parameters for the voltage regulator based on the location of the controller on the board or the version of the board as indicated by the external electrical parameter, and configure the control logic in accordance with the set of configuration parameters so that each output voltage is regulated based on the location of the controller on the board or the version of the board.

According to an embodiment of a voltage regulator, the voltage regulator comprises a plurality of power stages and a digital controller. The digital controller comprises control logic operable to control the power stages so that groups of one or more of the power stages individually regulate one or more output voltages of the voltage regulator and an interface for measuring an external electrical parameter that indicates a location of the controller on a board or the version of the board. The controller further comprises configuration logic operable to determine a set of configuration parameters for the voltage regulator based on the location of the voltage regulator on the board or the version of the board as indicated by the external electrical parameter, and configure the control logic in accordance with the set of configuration parameters so that each output voltage is regulated based on the location of the controller on the board or the version of the board.

According to an embodiment of an electronic system, the electronic system comprises a plurality of loads disposed on a board, a plurality of voltage regulators disposed at different locations on the board, each location on the board determining which of the loads is regulated by which of the voltage regulators, each of the voltage regulators comprising a plurality of power stages and a digital controller, and an external electrical parameter assigned to each of the voltage regulators for indicating the location of each voltage regulator on the board or the version of the board. Each of the voltage regulators is operable to regulate one or more output voltages. The voltage regulators have the same initial default configuration. Each of the voltage regulators is operable to change the initial default configuration based on the location of the voltage regulator on the board or the version of the board as indicated by the external electrical parameter assigned to the voltage regulator so that each voltage regulator provides one or more output voltages which are regulated based on the location of the voltage regulator on the board or the version of the board.

According to an embodiment of a method of configuring a voltage regulator, the method comprises: initializing the voltage regulator to a default configuration during reset or power-up of the voltage regulator; determining an external electrical parameter assigned to the voltage regulator, the external electrical parameter indicating a location of the voltage regulator on a board or a version of the board; determining a set of configuration parameters for the voltage regulator based on the location of the voltage regulator on the board or the version of the board as indicated by the external electrical parameter; and reconfiguring the voltage regulator in accordance with the set of configuration parameters so that each output voltage provided by the voltage regulator is regulated based on the location of the voltage regulator on the board or the version of the board.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein utilize an external electrical parameter such as resistance, voltage, or combination of voltage and resistance to identify the location of a digital voltage regulator controller on a board. The location of the digital controller on the board determines which load is regulated by which voltage regulator. Based on the location indicated by the external electrical parameter, the digital controller can derive the appropriate configuration to support the load from a default configuration or select the appropriate configuration from a set of configuration parameters stored by the controller. This way, all digital voltage regulator controllers on the same board can be identically provided with the same configuration information and used in any location on the board by selecting or deriving the appropriate configuration based on location. Such a design approach for digital voltage regulator controllers simplifies the process of configuring and tracking components for the controller manufacturer and for the board assembler. The controller can be soldered to the board and subsequently replaced if need be without having to keep track of the configuration of each controller or configure each controller after being soldered onto the board.

Figure 1:
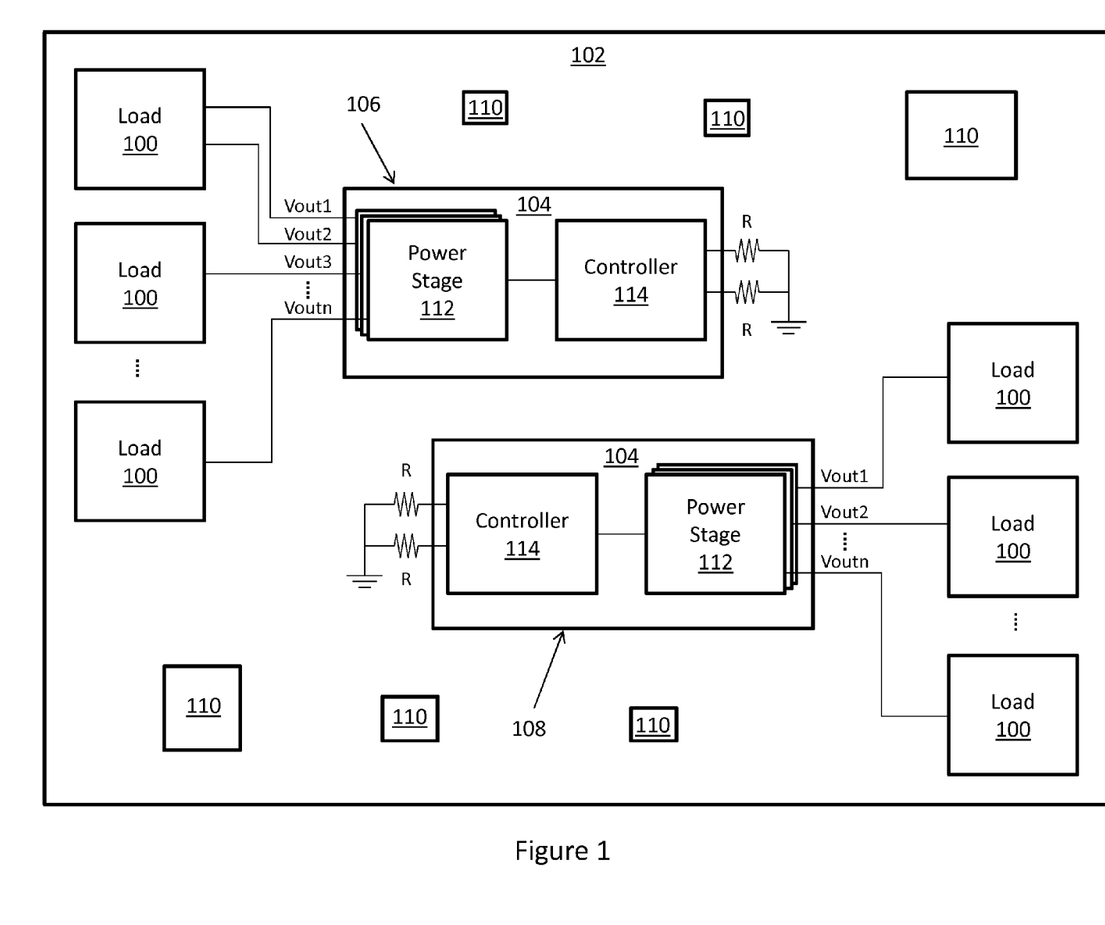
FIG. 1 illustrates a block diagram of an embodiment of an electronic system comprising a plurality of loads disposed on a board and a plurality of voltage regulators disposed at different locations on the board, each location on the board determining which of the loads is regulated by which of the voltage regulators.

FIG. 1 illustrates an embodiment of an electronic system that comprises a plurality of loads 100 disposed on a board 102 such as a printed circuit board (PCB) and a plurality of voltage regulators 104 disposed at different locations 106, 108 on the board 102. Additional passive and/or active components 110 can be attached to the board 102 e.g. by gluing, soldering, etc. Each location 106, 108 on the board 102 determines which of the loads 100 is regulated by which of the voltage regulators 104. Each of the voltage regulators 104 comprises a plurality of power stages 112 and a digital controller 114. An external electrical parameter such as resistance, voltage, or combination of voltage and resistance is assigned to each of the voltage regulators 104 for indicating the location 106, 108 of each voltage regulator 104 on the board 102 or the version of the board 102. In the former (first) case, each external electrical parameter indicates the location 106, 108 of a voltage regulator 104 on the board 102 which corresponds to the load 100 supplied by that regulator 104. This way, the same controller design can be used on a board 102 with loads 100 having different voltage regulation requirements. In the second (latter) case, the external electrical parameter identifies which version of the board 102 is being built so that each of the digital voltage regulator controllers 114 can implement the appropriate configuration for that version of the board 102. This way, the same controller design can be used on different versions of a board 102 e.g. with different component options or a similar but different design. The external electrical parameter assigned to each of the voltage regulators 104 is illustrated as one or more external resistors connected to the corresponding digital controller 114 and generically labelled 'R' in FIG. 1.

Figure 2:
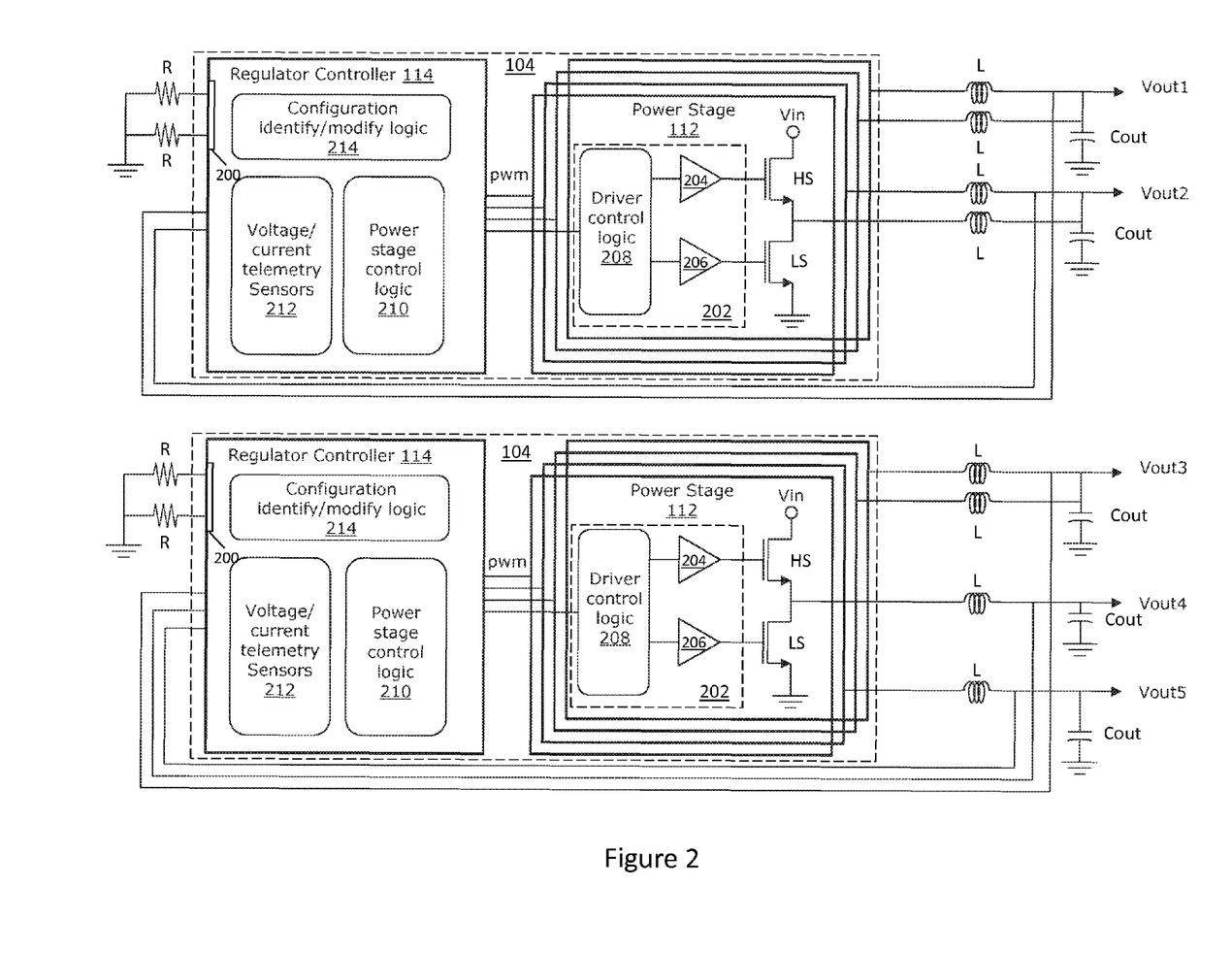
FIG. 2 illustrates a block diagram of an embodiment of two voltage regulators each with multiple configurations.

FIG. 2 shows two of the voltage regulators 104 in more detail. Each of the voltage regulators 104 is operable to regulate one or more output voltages (VoutX) for the load 100 to which the regulator 104 is connected. The voltage regulators 104 have the same initial default configuration, and each of the voltage regulators 104 can change the initial default configuration based on the location of the voltage regulator 104 on the board 102 or the version of the board 102 as indicated by the external electrical parameter associated with that location. The external electrical parameter assigned to each of the voltage regulators 104 is illustrated as one or more external resistors connected an interface 200 of the corresponding digital controller 114 and generically labelled 'R' in FIG. 2. Each one or more external resistors provides the corresponding voltage regulator controller 114 a means of identification of which instantiation the controller 114 is implementing. As such, each voltage regulator 104 provides one or more output voltages (VoutX) which are regulated based on the location of the voltage regulator 104 on the board 102 or the version of the board 102.

Each digital voltage regulator controller 114 can be a microcontroller, microprocessor, ASIC (application-specific integrated-circuit), etc. for controlling operation of each power stage 112 of the corresponding voltage regulator 104. Each voltage regulator 104 can include any number of power stages 112 including a single power stage (i.e. single-phase regulator) or more than one power stage (i.e. multi-phase regulator). The power stages 112 provide a regulated voltage to the corresponding load 100. Each power stage 112 delivers a phase current through one or more inductors (L) to the load 100 which is connected to the voltage regulator 104 via the inductors and one or more output capacitors (Cout) in parallel with the regulator output. The inductors for each regulator 104 can have the same or different values, and are generically labelled 'L' in FIG. 2. Similarly the output capacitors for each regulator 104 can have the same or different values, and are generically labelled 'Cout' in FIG. 2. The loads 100 can be high-performance integrated circuits such as microprocessors, graphics processors, network processors, etc. or other type of electronic circuits requiring voltage regulation. Each power stage 112 connects the corresponding load 100 to an input voltage (Vin) of the voltage regulator 104 in a first switching state and to ground in a second switching state.

The digital controller 114 for that regulator 104 manages the switching states of each power stage 112 to regulate each voltage (VoutX) delivered to the load 100, by adjusting the phase currents delivered to the load 100. In the case of PWM (pulse width modulation) based switching of the power stages 112, the controller 114 includes a PWM unit that generates PWM control signals (pwm) for switching the power stages 112. If the load current is low (e.g. lower than half of the phase current), synchronous converters allow the negative current (reverse current) to flow through low-side switches (LS) of one or more of the power stages 112 where it is dissipated. However if a low-side switch is off, the corresponding body diode cannot conduct the reverse current and it stays in HiZ (high impedance) or zero current which is called DCM (discontinuous conduction mode). The voltage regulators 104 can also operate in continuous conduction mode (CCM) with current sinking capability. In general, the switching state and duty cycle of the individual power stages 112 are determined at least in part based on the output voltage(s) provided to the corresponding load 100 so that the voltage regulators 104 can react quickly and reliably as possible to changing load conditions.

Each digital voltage regulator controller 114 can manage changes from one reference voltage to another. Each digital controller 114 can also determine errors between the output voltage(s) and a corresponding reference voltage, and convert the error voltage into a digital representation provided to the PWM unit for modifying the switching state and/or duty cycle of the power stages 112 e.g. by adjusting the duty cycle of the PWM control signals. Such voltage regulation functions are standard in typical digitally-controlled switching power converters, and therefore no further explanation is given in this regard.

The regulator power stages 112 each include driver circuitry 202 for setting the corresponding power stage 112 in a first switching state i.e. high-side switch (HS) on, low-side switch (LS) off, a second switching state i.e. high-side switch off, low-side switch on; or a non-switching state i.e. high-side switch off, low-side switch off responsive to a switching control signal (pwm) received by the power stage 112. The driver circuitry 202 can include a high-side driver 204 that generates the control signal for the gate of the high-side switch, a low-side driver 206 that generates the control signal for the gate of the low-side switch, and driver control logic 208 for generating internal signals in response to the switching control signal (pwm) so to that the high-side and low-side drivers 204, 206 generate the appropriate gate control signals for the high-side and low-side switches so that each switching state can be implemented. The driver circuitry 202 of each power stage 112 can include additional components such as one or more voltage supplies and input bias circuits, level shifter and bootstrap circuitry for the high-side switch, a current monitor for measuring or sensing the output current of the power stage through the corresponding inductor, a temperature sensor for measuring the temperature of the power stage, etc. Such standard power stage components are well known and not shown in further detail in FIG. 2 for ease of illustration.

Each of the digital voltage regulator controllers 114 includes control logic 210 for controlling each power stage 112 of the corresponding voltage regulator 104 via a switching control signal (pwm) so that groups of one or more of the power stages 112 individually regulate one or more output voltages (VoutX) of the voltage regulator 104. The power stage control logic 210 can include a PID (proportional-integral-derivative) controller, a PWM unit, an AVP (adaptive voltage position) unit, current balancing unit, etc. each of which is well known in the art and therefore no further explanation is given herein in this regard.

Each of the digital voltage regulator controllers 114 also includes voltage and/or current telemetry sensors 212 for measuring the phase currents and/or output voltage(s) of the power stages 112 controlled by the digital controller 114, for use by the power stage control logic 210 in controlling the switching of the power stages 112 to maintain proper output regulation. Such voltage and/or current telemetry sensors 212 are well known in the art and therefore no further explanation is given herein in this regard.

Each of the digital voltage regulator controllers 114 further includes an interface 200 for obtaining the external electrical parameter that indicates the location of the controller 114 on the board 102 or the version of the board 102, and configuration logic 214 for determining a set of configuration parameters for the corresponding voltage regulator 104 based on the location of the controller 114 on the board 102 or the version of the board 102 as indicated by the external electrical parameter. The configuration logic 214 also configures the power stage control logic 210 in accordance with the set of location-specific configuration parameters so that each output voltage is regulated based on the location of the controller 114 on the board 102 or the version of the board 102. The power stage control logic 210 and the configuration logic 214 can be implemented by the same micro-controller e.g. in firmware.

Figure 3:
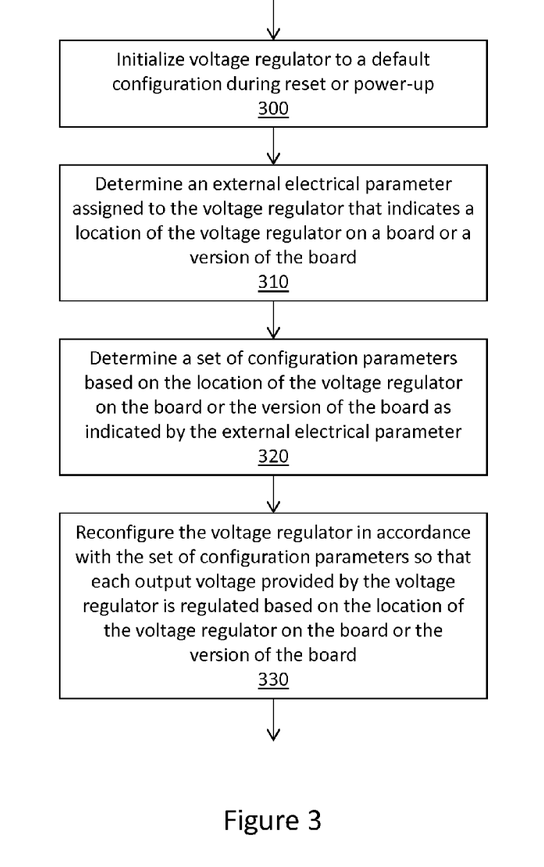
FIG. 3 illustrates a flow diagram of an embodiment of configuring a voltage regulator.

FIG. 3 illustrates a flow diagram of an embodiment of a method of configuring each voltage regulator 104 by the respective digital controller 114. The method comprises initializing the voltage regulator 104 to a default configuration during reset or power-up of the voltage regulator 104 (Block 300), and determining an external electrical parameter assigned to the voltage regulator 104. The external electrical parameter indicates the location of the voltage regulator 104 on a board 102 or a version of the board 102 as previously described herein (Block 310). The default configuration parameters can include at least one of a number of power stages 112 in each of the groups of power stages 112, alignment of the power stages 112 in each of the groups of power stages 112 (i.e. which power stage is first, second, etc.), power stage switching frequency, output voltage (Vout), output inductance, output capacitance, output voltage and current limits, output filter inductance and capacitance, regulator startup sequence information, compensator transfer function parameters such as PID gain parameters, digital bus address such as $I^2C$, SMBUS (system management bus), PMBUS (power management bus), SVID (serial voltage definition), etc., power stage type, power stage advanced features such as low power modes, fault detection, and integrated sensors, and current and/or voltage and/or temperature sensor gain and offset.

The method further comprises determining a set of configuration parameters for the voltage regulator 104 based on the location of the voltage regulator 104 on the board 102 or the version of the board 102 as indicated by the external electrical parameter (Block 320), and reconfiguring the voltage regulator 104 in accordance with the location-specific set of configuration parameters so that each output voltage provided by the voltage regulator 104 is regulated based on the location of the voltage regulator 104 on the board 102 or the version of the board 102 (Block 330). According to an embodiment, each digital voltage regulator controller 114 stores sets of predetermined configuration parameters for the corresponding voltage regulator 104, each set of predetermined configuration parameters corresponding to a different location on the board 102 or a different version of the board 102. According to this embodiment, the configuration logic 214 of the digital controller 114 configures the power stage control logic 210 of the controller 114 in accordance with the set of predetermined configuration parameters that corresponds to the external electrical parameter associated with that controller 114.

Figure 4:
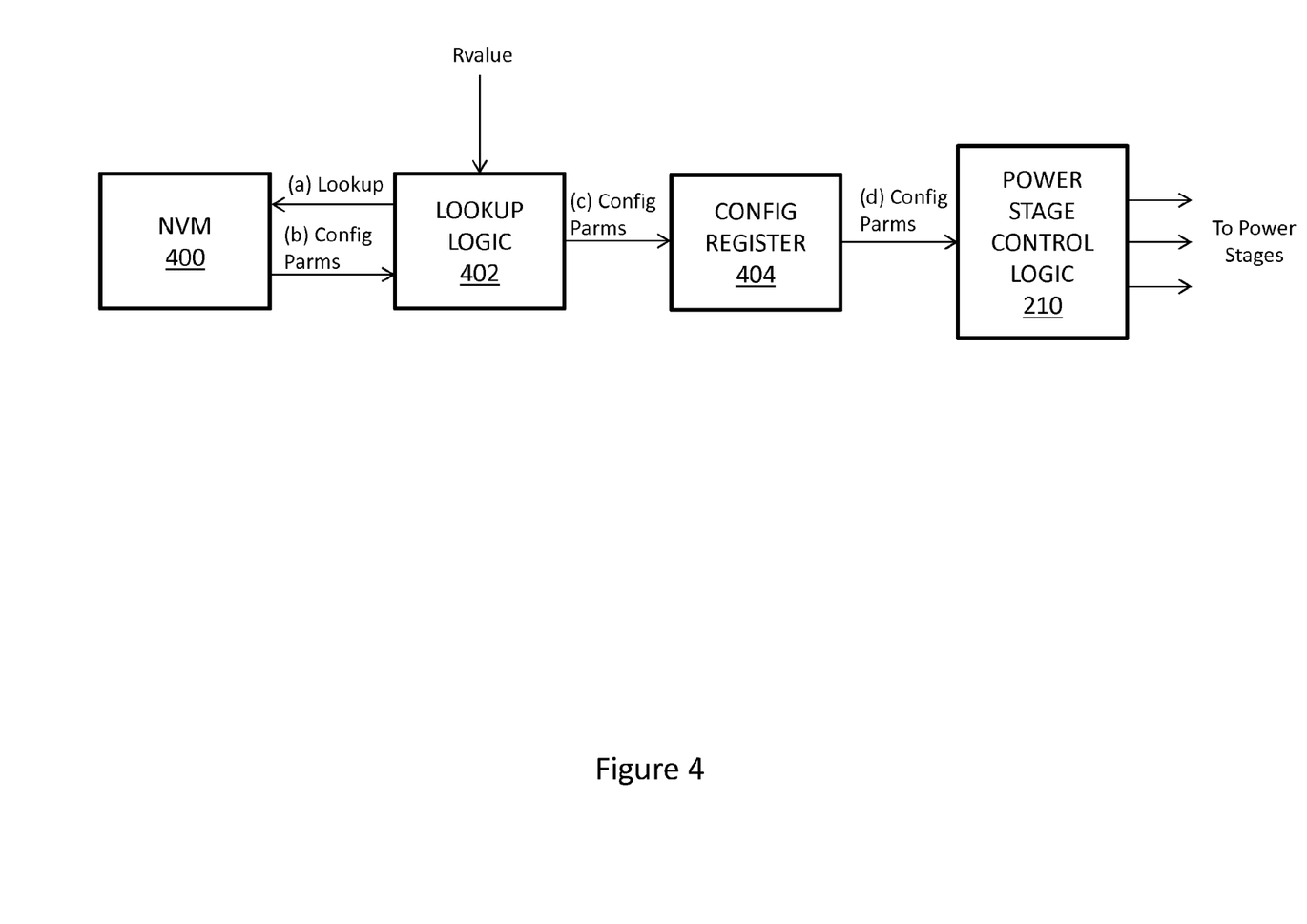
FIG. 4 illustrates a block diagram of an embodiment of controller logic included in a digital voltage regulator controller having multiple configuration options.

FIG. 4 illustrates an embodiment of the digital voltage regulator controller 114 which stores sets of predetermined configuration parameters. Each set of the predetermined configuration parameters corresponds to a different location on the board 102 or a different version of the board 102. The digital controller 114 comprises a nonvolatile memory (NVM) 400 such as read-only memory, e-fuse or other one-time-programmable memory, EEPROM, flash memory, ferroelectric RAM (F-RAM), magnetoresistive RAM (MRAM), or other multi-time programmable memory, for storing the sets of predetermined configuration parameters.

The interface 200 of the digital voltage regulator controller 114 includes circuitry such as current and/or voltage sense circuitry, an ADC (analog to digital converter), one or more filters, etc. for measuring the external electrical parameter associated with that controller and generating a corresponding digital value (Rvalue). The controller configuration logic 214 includes a lookup table function 402 for performing a lookup (step 'a' in FIG. 4) in the nonvolatile memory 400 based on the digital value to retrieve the set of predetermined configuration parameters that corresponds to the digital value. That is, each set of predetermined configuration parameters can have an index corresponding to different values of Rvalue and the set of predetermined configuration parameters with the index that matches Rvalue is retrieved (step 'b' in FIG. 4) from the nonvolatile memory 400 by the lookup table function 402. The controller configuration logic 214 then stores (step 'c' in FIG. 4) the set of predetermined configuration parameters retrieved from the nonvolatile memory 400 in a set of registers 404 accessible by the power stage control logic 210 of the controller 114.

The power stage control logic 210 accesses (step 'd' in FIG. 4) the set of predetermined configuration parameters stored in the set of registers 404 and reconfigures the voltage regulator 104 in accordance with this set of configuration parameters so that each output voltage provided by the voltage regulator 104 is regulated based on the location of the voltage regulator 104 on the board 102 or the version of the board 102 as indicated by the digital value (Rvalue) that corresponds to the external electrical parameter associated with the controller 114. This can include reconfiguring the number of power stages 112 in each of the groups of power stages 112, changing the alignment of the power stages 112 in each of the groups of power stages 112, adjusting one or more of the power stage switching frequency, output voltage, output inductance, output capacitance, output voltage and current limits, output filter inductance and capacitance, modifying the voltage regulator startup sequence, adjusting one or more compensator transfer function parameters, adjusting the current and/or voltage sensor (telemetry) gain and offset, etc.

According to another embodiment, each digital voltage regulator controller 114 is initially configured based on default configuration parameters accessible by the controller configuration logic 214. According to this embodiment, the controller configuration logic 214 modifies one or more of the default configuration parameters based on the location of the controller 114 on the board 102 or the version of the board 102 as indicated by the external electrical parameter.

Figure 5:
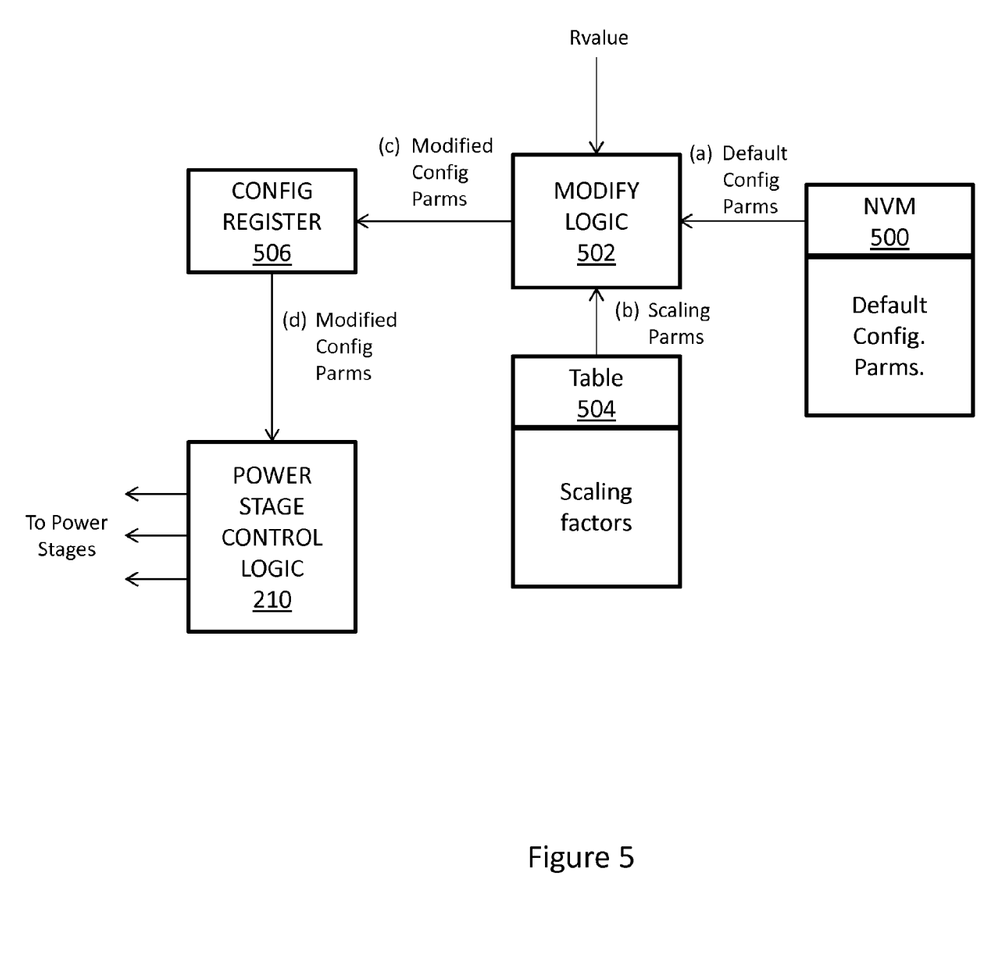
FIG. 5 illustrates a block diagram of another embodiment of controller logic included in a digital voltage regulator controller having multiple configuration options.

FIG. 5 illustrates an embodiment of the digital voltage regulator controller 114 which is initially configured based on default configuration parameters accessible by the controller configuration logic 214 and which modifies one or more of the default configuration parameters based on the external electrical parameter. The controller 114 comprises a nonvolatile memory (NVM) 500 such as read-only memory, flash memory, ferroelectric RAM (F-RAM), magnetoresistive RAM (MRAM), etc. for storing the default configuration parameters. The control logic 214 of the controller 114 also includes modify logic 502 for retrieving (step 'a' in FIG. 4) the default configuration parameters from the nonvolatile memory 500 and modifying one or more of the default configuration parameters based on the location of the controller 114 on the board 102 or the version of the board 102 as indicated by a digital representation (Rvalue) of the external electrical parameter as provided by the interface circuitry 200 of the controller 114. In one embodiment, the modify logic 502 scales (step 'b' in FIG. 4) one or more of the default configuration parameters using a rule set that is based on or a function of the external electrical parameter. For example, the modify logic 502 can access (step 'b' in FIG. 4) a table 504 that stores sets of scaling factors each of which is associated with a different location on the board 102 or a different version of the board 102 and scales one or more of the default configuration parameters based on the set of scaling factors that corresponds to Rvalue. That is, each set of scaling factors can have an index corresponding to different values of Rvalue and the set of scaling factors with the index that matches Rvalue is retrieved from the table 504 by the modify logic 502. The modify logic 502 then stores (step 'c' in FIG. 4) the modified configuration parameters in a set of registers 506 accessible by the power stage control logic 210 of the controller 114.

The power stage control logic 210 accesses (step 'd' in FIG. 4) the modified configuration parameters stored in the set of registers 506 and reconfigures the voltage regulator 104 in accordance with the modified configuration parameters so that each output voltage provided by the regulator 104 is regulated based on the location of the voltage regulator 104 on the board 102 or the version of the board 102 as indicated by the digital value (Rvalue) that corresponds to the external electrical parameter associated with the controller 114. This can include reconfiguring the number of power stages 112 in each of the groups of power stages 112, changing the alignment of the power stages 112 in each of the groups of power stages 112, adjusting one or more of the power stage switching frequency, output voltage, output inductance, output capacitance, output voltage and current limits, output filter inductance and capacitance, modifying the startup sequence for the voltage regulator, adjusting one or more compensator transfer function parameters, adjusting the current and/or voltage sensor (telemetry) gain and offset, etc.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A digital voltage regulator controller, comprising:
control logic operable to control a plurality of power stages of a voltage regulator so that groups of one or more of the power stages individually regulate one or more output voltages of the voltage regulator;
an interlace for measuring an external electrical parameter that indicates a location of the controller on a board or a version of the board; and
configuration logic operable to determine a set of configuration parameters for the voltage regulator based on the location of the controller on the board or the version of the board as indicated by the external electrical parameter, and configure the control logic in accordance with the set of configuration parameters so that each output voltage is regulated based on the location of the controller on the board or the version of the board.

2. The digital voltage regulator controller of claim 1, further comprising a nonvolatile memory operable to store sets of predetermined configuration parameters for the voltage regulator, each set of the predetermined configuration parameters corresponding to a different location on the board or a different version of the board, wherein the configuration logic is operable to configure the control logic in accordance with the set of predetermined configuration parameters that corresponds to the external electrical parameter.

3. The digital voltage regulator controller of claim 2, wherein the configuration logic is operable to store the set of predetermined configuration parameters that corresponds to the external electrical parameter in a set of registers accessible by the control logic.

4. The digital voltage regulator controller of claim 2, further comprising circuitry operable to generate a digital value corresponding to the external electrical parameter, and wherein the configuration logic is operable to perform a lookup in the nonvolatile memory based on the digital value to retrieve the set of predetermined configuration parameters that corresponds to the digital value.

5. The digital voltage regulator controller of claim 2, wherein the predetermined configuration parameters stored in the nonvolatile memory include at least one of:
a number of power stages in each of the groups of power stages;
alignment of the power stages in each of the groups of power stages;
power stage switching frequency;
output voltage;
output inductance;
output capacitance;
output voltage and current limits;
output filter inductance and capacitance;
startup sequence information for the voltage regulator;
compensator transfer function parameters;
digital bus address;
power stage type; and
sensor gain and offset.

6. The digital voltage regulator controller of claim 1, wherein the control logic is initially configured based on default configuration parameters accessible by the configuration logic, and wherein the configuration logic is operable to modify one or more of the default configuration parameters based on the location oldie controller on the board or the version of the board as indicated by the external electrical parameter.

7. The digital voltage regulator controller of claim 6, wherein the configuration logic is operable to scale one or more of the default configuration parameters using a rule set that is based on the external electrical parameter.

8. The digital voltage regulator controller of claim 6, wherein the configuration logic is operable to access a table that stores sets of scaling factors each of which is associated with a different location on the board or a different version of the board and scale one or more of the default configuration parameters based on the scaling factor that corresponds to the external electrical parameter.

9. The digital voltage regulator controller of claim 6, wherein the default configuration parameters include at least one of:
a number of power stages in each of the groups of power stages;
alignment of the power stages in each of the groups of power stages;
power stage switching frequency;
output voltage;
output inductance;
output capacitance;
output voltage and current limits;
output filter inductance and capacitance;
startup sequence information for the voltage regulator;
compensator transfer function parameters;
digital bus address;
power stage type; and
sensor gain and offset.

10. The digital voltage regulator controller of claim 1, wherein the external electrical parameter is a resistance, voltage, or combination of voltage and resistance.

11. A voltage regulator, comprising:
a plurality of power stages; and
a digital controller comprising:
control logic operable to control the power stages so that groups of one or more of the power stages individually regulate one or more output voltages of the voltage regulator;
an interface for measuring an external electrical parameter that indicates a location of the controller on a board or a version of the board; and
configuration logic operable to determine a set of configuration parameters for the voltage regulator based on the location of the voltage regulator on the board or the version of the board as indicated by the external electrical parameter, and configure the control logic in accordance with the set of configuration parameters so that each output voltage is regulated based on the location of the controller on the board or the version of the board.

12. The voltage regulator of claim 11, wherein the digital controller further comprises a nonvolatile memory operable to store sets of predetermined configuration parameters for the voltage regulator, each set of the predetermined configuration parameters corresponding to a different location on the board or a different version of the board, and wherein the configuration logic is operable to configure the control logic in accordance with the set of predetermined configuration parameters that correspond to the external electrical parameter.

13. The voltage regulator of claim 12, wherein the digital controller further comprises circuitry operable to generate a digital value corresponding to the external electrical parameter, and wherein the configuration logic is operable to perform a lookup in the nonvolatile memory based on the digital value to retrieve the set of predetermined configuration parameters that corresponds to the digital value.

14. The voltage regulator of claim 11, wherein the control logic is initially configured based on default configuration parameters, and wherein the configuration logic is operable to modify one or more of the default configuration parameters based on the location of the controller on the board or the version of the board as indicated by the external electrical parameter.

15. The voltage regulator of claim 14, wherein the configuration logic is operable to scale one or more of the default configuration parameters using a rule set that is based on the external electrical parameter.

16. The voltage regulator of claim 14, wherein the configuration logic is operable to access a table that stores sets of scaling factors each of which is associated with a different location on the board or a different version of the board and scale one or more oldie default configuration parameters based on the scaling factor that corresponds to the external electrical parameter.

17. The voltage regulator of claim 11, wherein the external electrical parameter is a resistance, voltage, or combination of voltage and resistance.

18. An electronic system, comprising:
a plurality of loads disposed on a board;
a plurality of voltage regulators disposed at different locations on the board, each location on the board determining which of the loads is regulated by which of the voltage regulators, each of the voltage regulators comprising a plurality of power stages and a digital controller; and
an external electrical parameter assigned to each of the voltage regulators for indicating the location of each voltage regulator on the board or a version of the board,
wherein each of the voltage regulators is operable to regulate one or more output voltages,
wherein the voltage regulators have the same initial default configuration,
wherein each of the voltage regulators is operable to change the initial default configuration based on the location of the voltage regulator on the board or the version of the as indicated by the external electrical parameter assigned to the voltage regulator so that each voltage regulator provides one or more output voltages which are regulated based on the location of the voltage regulator on the board or the version of the board.

19. The electronic system of claim 18, wherein each external electrical parameter is a resistance, voltage, or combination of voltage and resistance.

20. A method of configuring a voltage regulator, the method comprising:

initializing the voltage regulator to a default configuration during reset or power-up of the voltage regulator;
determining an external electrical parameter assigned to the voltage regulator, the external electrical parameter indicating a location of the voltage regulator on a board or a version of the board;
determining a set of configuration parameters for the voltage regulator based on the location of the voltage regulator on the board or the version of the board as indicated by the external electrical parameter; and
reconfiguring the voltage regulator in accordance with the set of configuration parameters so that each output voltage provided by the voltage regulator is regulated based on the location of the voltage regulator on the board or the version of the board.

21. The method of claim 20, further comprising:
storing sets of predetermined configuration parameters in a nonvolatile memory of the voltage regulator, each set of the predetermined configuration parameters corresponding to a different location on the board or a different version of the board; and
reconfiguring the voltage regulator in accordance with the set of predetermined configuration parameters that corresponds to the external electrical parameter.

22. The method of claim 21, further comprising:
generating a digital value corresponding to the external electrical parameter; and
performing a lookup in the nonvolatile memory based on the digital value to retrieve the set of predetermined configuration parameters that corresponds to the digital value.

23. The method of claim 20, wherein the voltage regulator is initialized based on default configuration parameters stored in the voltage regulator, the method further comprising:
modifying one or more of the default configuration parameters based on the location of the voltage regulator on the board or the version of the board as indicated by the external electrical parameter.

24. The method of claim 23, wherein modifying the one or more of the default configuration parameters comprises:
scaling the one or more of the default configuration parameters using a rule set that is based on the external electrical parameter.

25. The method of claim 23, wherein modifying the one or more of the default configuration parameters comprises:
accessing a table that stores sets of scaling factors each or which is associated with a different location on the board or a different version of the board; and
scaling the one or more of the default configuration parameters based on the scaling factor that corresponds to the external electrical parameter.

* * * * *

UNITED STATES PATENT AND TRADEMARK OFFICE
CERTIFICATE OF CORRECTION

PATENT NO. : 9,748,839 B2
APPLICATION NO. : 14/230943
DATED : August 29, 2017
INVENTOR(S) : B. Tang It is certified that error appears in the above-identified patent and that said Letters Patent is hereby corrected as shown below:

Column 9, Line 11 (Claim 1, Line 6), please change "interlace" to -- interface --.
Column 11, Line 20 (Claim 16, Line 5), please change "oldie" to -- of the --.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*